United States Patent [19]

Harton

[11] Patent Number: 4,930,449
[45] Date of Patent: Jun. 5, 1990

[54] PORTABLE HAY FEEDER

[76] Inventor: Shelby H. Harton, Star Rte. Box 128, Rosansky, Tex. 78952

[21] Appl. No.: 258,727

[22] Filed: Oct. 17, 1988

Related U.S. Application Data

[63] Continuation-in-part of Ser. No. 137,609, Dec. 24, 1987, abandoned.

[51] Int. Cl.⁵ .............................................. B60Q 5/00
[52] U.S. Cl. .................................................... 119/60
[58] Field of Search .............................. 119/58, 59, 60

[56] References Cited

U.S. PATENT DOCUMENTS

| | | | |
|---|---|---|---|
| 669,226 | 3/1901 | Stoner | 119/59 |
| 3,834,353 | 9/1974 | Groezinger | 119/60 |
| 4,020,794 | 5/1977 | Nethery | 119/60 |
| 4,258,663 | 3/1981 | Schoessow | 119/58 |

Primary Examiner—Cary E. Stone
Attorney, Agent, or Firm—Joseph F. Long

[57] ABSTRACT

A portable hay feeder with open sides pivotally connected with angle brackets which are pivotally connected with roof rafters of the unit in such fashion that the sides will swing in an essentially vertical position as an animal pushes the sides against hay contained between the sides; spacer bar or rods forming vertical openings in the sides are properly spaced so that an animal may eat but the animal's head will not go between the upright space bars, thus the animals head pushes the sides inward allowing total consumption and minimizing waste.

9 Claims, 2 Drawing Sheets

PORTABLE HAY FEEDER

BACKGROUND OF THE INVENTION

This is a continuation-in-part of my application Ser. No. 137,609 for A Portable Hay Feeder, filed 12/24/87, abandoned.

Feeding of livestock continues to be a large and competitive business and cost of labor, machinery and fertilizer for raising necessary feed for the livestock tends to increase. Thus there is a necessity to feed in the most efficient lowest cost manner.

The present invention is for a unique type of hay feeder that may be filled with common mechanical equipment and will prevent waste while protecting the hay from rain and will allow the animals free access so that all hay may be consumed but cannot be wasted. Portability allows the unit to be moved to the most advantageous location and with multiple units most any sized herd may be fed with a minimum of hand labor by one man with normal hay moving equipment.

We have considered the following patents in this field:

| U.S. Pat. No. | Inventor | Date |
| --- | --- | --- |
| 4,020,794 | Nethery | 5/3/1977 |
| 4,070,991 | Schmiesing | 1/31/1978 |
| 4,706,609 | Delechte | 11/17/1987 |
| 4,574,740 | Koebel | 3/11/1986 |
| 4,488,565 | Smith | 12/18/1984 |
| 275,239 | Marsh | 4/3/1883 |
| 4,089,301 | Harden | 5/16/1978 |
| 4,193,378 | Harden | 4/18/1980 |
| 4,346,671 | Wagner | 8/31/1982 |
| 3,802,394 | Mahler | 4/9/1974 |
| 4,294,197 | Snel et al | 10/13/1981 |

Each of these units as described in their patents, lack some of the features necessary to have a long life, low maintenance efficient feeder as described in my invention.

My portable hay feeder described in detail in these specifications, drawings and claims is usually sized to contain a minimum of two round bales of hay held end to end in the open rectangular structure. These two bales are sufficient to feed fifteen cows for seven days making the unit particularly suitable for a small herd or dispersed feeding of larger herds.

In-use experimentation has lead to the following unique aspects of the unit:

1. The unit is mounted on runners and is less than ten feet wide so that it may be pulled thru a normal ranch gate with a pick-up or tractor.

2. Both ends and both sides may have vertical openings, usually formed using re-bar, a minimum of two inches apart for feeding goats or sheep and usually six inches apart for feeding cattle. Note that in some embodiments the swinging ends may be a sheet of metal instead of the preferred open ends that allow an animal to feed thru the ends as well as the sides.

3. Swinging ends may be fastened in an open position and have a bar which may be a pipe or angle iron across the opening about six inches up from the floor so that when a bale of hay is placed in the unit with a fork lift or similar mechanical means, the mechanical means may be easily removed without slideably removing the bale.

4. The unit usually weighs over three hundred pounds and is usually made of metal with re-bar open sides and ends. The vertical openings prevent an animal from lifting the unit and allows the animal to disengage a horn caught in one of the vertical openings.

5. The open sides are pivotally connected with angled support pieces that are in turn pivotally connected with the roof rafters or with re-enforcing structure between the side two support posts. A rope or cable attached to a center part of the top of an open side may be manually pulled, or pulled with a "come along" or a hand operated winch, and fastened to hold the sides completely open with the opening sized to easily receive a round bale as well as the smaller square bales. The open sides allow easy removal of the twine or wire holding a bale together.

6. When an animal feeds, the openings allow pulling out only a mouthful at a time and the floor, which is usually V shaped sloping toward the center, is extended to catch any hay that falls. Further, the pivotal connection of the side with an angle bracket that is also pivotally connected with the re-enforcing structure or roof rafter allows an animal to push or bias the side inward against the hay so that all hay may be consumed. This type of pivotal connection allows the side to swing outward when an animal ceases feeding and thus discourages an animal from stepping up on the extension of the floor.

7. Usually a V shaped floor is used with openings to drain any water blown in under the roof toward the apex of the V so that water quickly drains off the hay.

8. Size of the openings in the sides and ends may be varied to feed sheep or goats as well as cattle or horses. It is not necessary for operation of the unit that the ends be constructed for an animal to eat thru the ends but is preferable.

BRIEF DESCRIPTION OF THE INVENTION

The unit may be made completely of metal or partially of wood and remainder of metal. When made of metal galvanized steel is preferred for the frame structure with special coating of welded joints to prevent rust to give a longer life.

In one preferred embodiment 1½" galvanized angle iron is used for support posts supporting a rectangular gable type of galvanized metal roof over 1½" angle iron roof rafters and attached to a 16 gauge metal floor that has a shallow V shape sloping toward a center point with drain holes to drain out water that blows under the roof. The floor is extended approximately eight inches out from the side vertical support posts (to catch hay that falls when an animal pulls hay thru the open sides).

In a preferred embodiment both ends are made using approximately ½" metal rods (such rods may be the commonly used re-enforcing rods or re-bar) spaced vertically six inches apart and welded between an upper and lower 1" pipe. Both ends swing open and are hinged from support posts with a latch to hold the end in a closed position. A hinged single straight piece is attached to the lower pipe of the swinging open end so that when the end is opened the straight piece frictionally engages the ground to prevent the end from closing until the hinged straight piece is manually lifted up.

A 1½" angle iron is welded approximately 8" from the floor across the openings made by opening the swinging open ends.

The roof is supported by 1½"0 angle iron welded near the top of the support posts between both ends and both sides with 1½" rafters under the roof welded to the 1½" perimeter angle iron.

Each open side may be made using re-bar welded to 1" pipe and spaced six inches apart (for a cattle feeder). A minimum of two angle brackets are on each side. Each angle bracket has an open angle that is 90 degrees plus the angle for the pitch of the roof, or that is shaped so one end may be pivotally connected with a rafter with a ⅜" bolt and when the bracket is pushed against the roof the other leg of the bracket will hang in a vertical position. The sides are then pivotally connected with each bracket. The pivotal connection may easily be made by putting a short section of 1¼" pipe around the upper 1" pipe or rail of the side and welded to the angle bracket open side. As the open side is biased inward by cattle feeding on the hay contained between the pivoted open sides, the side will move inward and downward and the side is made with sufficient clearance so as not to touch the V shaped metal floor.

A rope attached to the upper pipe in a center position of the open side runs thru a pulley attached to a rafter in such a position that the open side may be manually pulled to an open position. In some embodiments a manually operated winch is used to allow use of less manual force to pull the sides to vertical positions.

Obviously minor mechanical changes can be made within the general spirit and purpose of the invention as outlined. Therefore we do not wish to be limited to exact details as outlined but only as to general spirit and purpose.

DETAILED DESCRIPTION OF THE DRAWINGS

Figure 1:
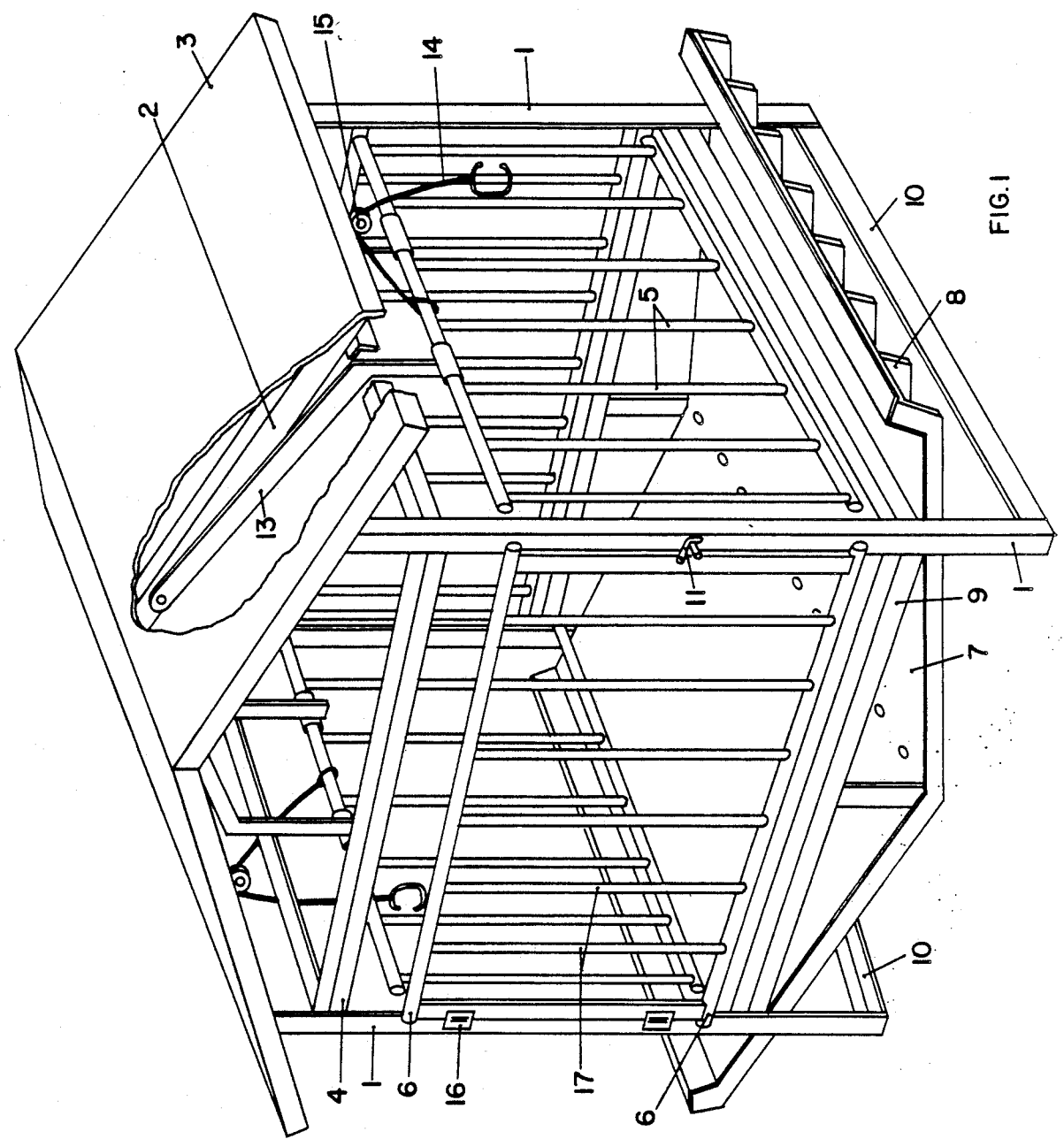
In FIG. 1 we show a three dimensional view of the feeder with the sides in a fully open position.

In FIG. 1 we show a three dimensional view of the unit with four angle iron support posts, 1 welded to floor support beams 8 that hold floor 7 that may be 16 gauge metal, and welded to roof rafters 2 and reinforcing structure 4; a cross bar 9 welded across an opening formed when the swinging open end 17 is in an open position prevents a hay bale placed in the unit with a fork lift from sliding out as the fork lift tines are removed. Metal roof 3 may be attached to the metal rafters 2 by bolting or spot welding.

The swinging open ends 17 are made using 1" pipe 6 with re-bar or ½" rod welded between top and bottom pipes and spaced approximately 6" apart for cattle feeding and less for feeding goats or sheep. Hinges 16 are welded to support posts 1 on one side with a closure hasp 11 on the opposite side. The runners 10 are welded to the bottoms of support posts 1.

The open sides 5 are made with 1" pipe with re-bar or half inch rods welded vertically to form vertical openings that may be 2" wide to feed goats or 6" inches wide to feed cows. The upper rail or pipe of the open sides 5 are pivotally attached on each end to angle brackets 13 that are pivotally bolted on the other end to one of the roof rafters 2.

On each side of the unit a rope or cable 14 is attached to the upper pipe or rail of open side 5 and runs thru a pulley 15 to allow manually pulling the open sides 5 to a fully open position for loading the unit.

Figure 3:
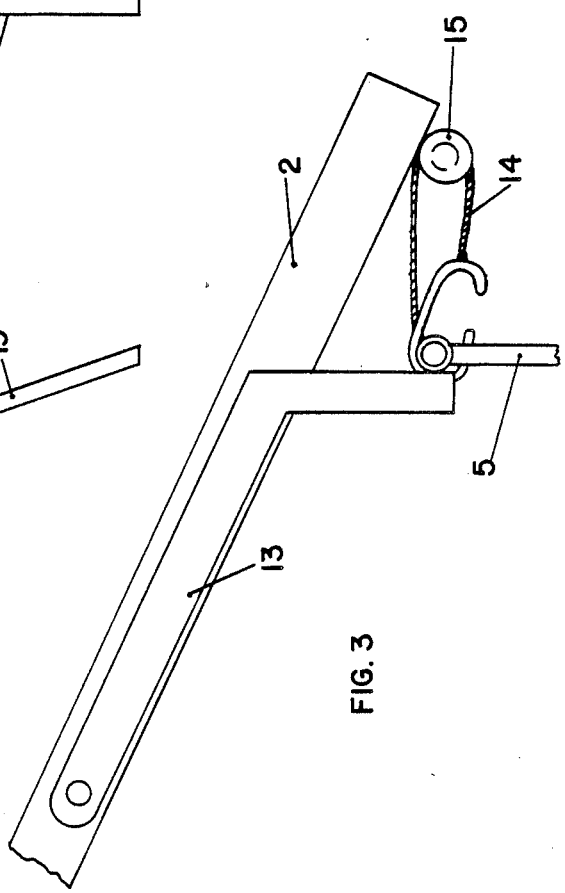
In FIG. 3 we detail a view of a side pivotally connected with an angle bracket which in turn is pivotally connected to a roof rafter.

In FIG. 3 we show a detail of angle bracket 13 moveably bolted to rafter 2 and pivotally attached to the upper rail or pipe of open sides 5 using a short section of 1¼" pipe around the upper rail or pipe of open side 5, welded to bracket 13. Rope 14 running thru pulley 15 is shown hooked back over the upper rail of open side 5 to hold open side 5 in a fully open position.

Figure 2:
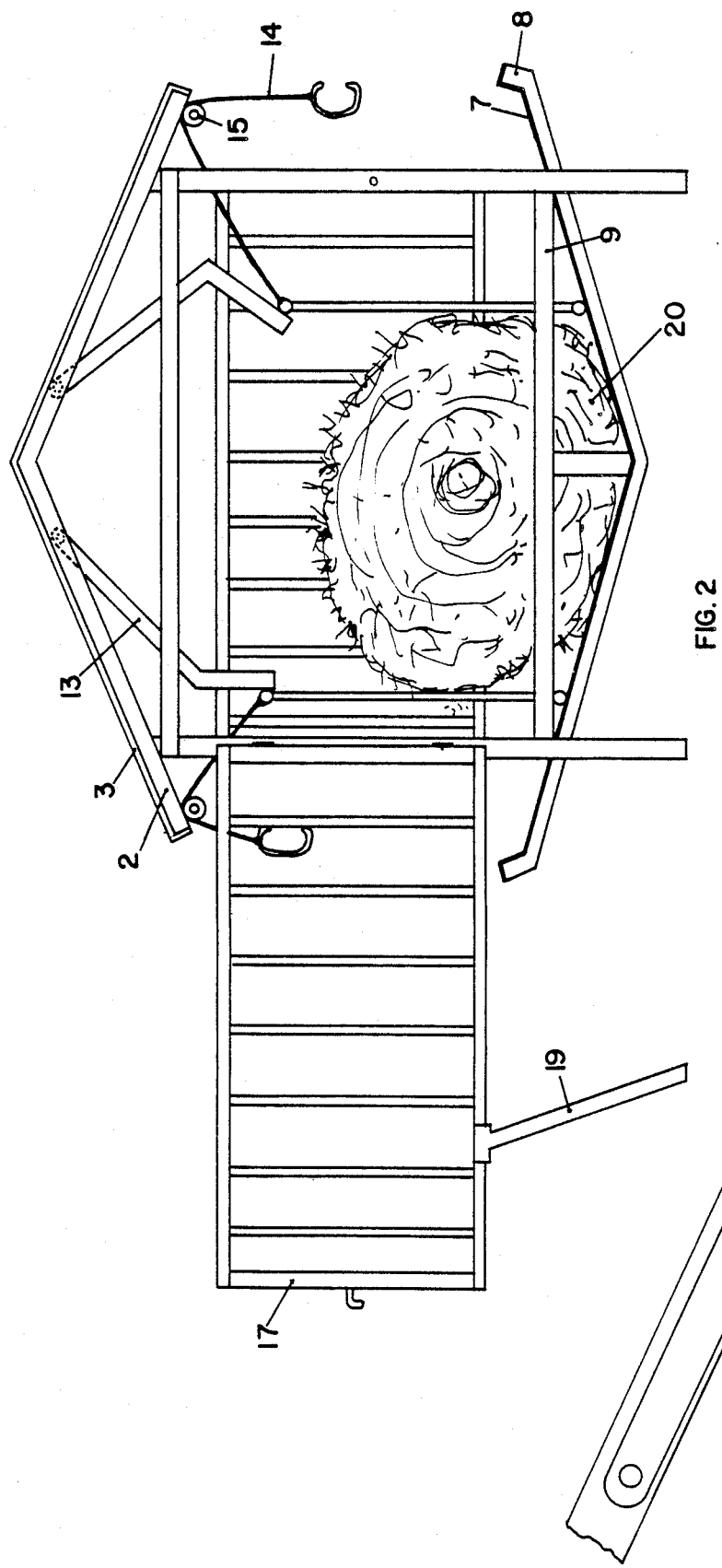
In FIG. 2 we show an end view of the unit with one swinging end held in an open position.

In FIG. 2 we show a front view of the unit with one swinging open end 17 being held in an open position by a rod or pipe 19 pivotally connected with a lower rail of end 17. This view shows a partially consumed hay bale 20 and position of open sides 5 pivotally attached to brackets 13 which are moveably bolted to roof rafters 2. Also shown is an end view of bottom 7, bottom support beams 8, and crossbar 9. Rope 14 which may be lightly counter weighted moves freely thru pulley 15 at this point.

What is claimed is:

1. A portable hay feeder comprising:
   a. a rectangular structure with support posts at each corner attached between a sloping roof and a V shaped floor;
   b. end wall gates, made of vertical bars which are spaced a minimum of 2" apart, between said sloping roof and said V shaped floor of said rectangular structure with a horizontal bar across an opening formed when said end wall gates are in an open position, said horizontal bars acting to hold material from being slideably removed from said rectangular structure;
   c. means for pivotally fastening said end wall gates to said rectangular structure;
   d. two side gates, made with vertical bars a minimum of two inches apart, said side gates being pivotally connected at the top of each of said side gates to a minimum of two angle support brackets that are in turn pivotally connected to a re-enforcing structure beneath said sloping roof of said rectangular structure in such manner that a first biasing means may pull said side gates apart with said side gates hanging in a vertical position; removal of said first biasing means allows a second biasing means to move each of said side gates toward a center of said rectangular structure while removal of said second biasing means will allow said side gates to move outward from said center.

2. A portable hay feeder as in claim 1 where said V shaped floor contains openings so located as to drain water from said V shaped floor.

3. A portable hay feeder as in claim 1 where said V shaped floor is a minimum of sixteen inches wider than the width of an outermost position of said two side gates.

4. A portable hay feeder as in claim 1 where said support posts are mounted on runners.

5. A portable hay feeder as in claim 1 where said first biasing means comprises a rope attached to a top rail of each of said two side gates and going through a pulley mounted on said re-inforcing structure beneath said sloping roof of said rectangular structure to allow manually biasing said side gates to a fully open position and where said second biasing means is the face portion of an animal's head pushing said side gates toward hay contained between said two side gates.

6. A portable hay feeder as in claim 1 where said floor is a minimum of sixteen inches wider than said maximum width opening to contain said hay.

7. A portable hay feeder as in claim 1 where said floor has openings to prevent water accumulation on said floor.

8. A portable hay feeder as in claim 1 where a leverage means with a releasable holding means allows manually biasing and holding said two side gates in a position to form said maximum width opening.

9. A portable hay feeder comprising:
 a. a roof with a support post at each of four corners of said roof;
 b. a V shaped floor connected to said support posts a minimum of six inches above a lower end of said support posts;
 c. two runners in parallel, with each of said two runners connected to said lower end of two of said support posts;
 d. end wall gates, made of vertical bars which are a minimum of 2" apart, mounted between said roof and said floor, and having means to fasten said end wall gates in a closed position and means to hold said end wall gates in an open position;
 e. a bar across each opening formed when said end wall gates are in an open position, said bar located to prevent slideable removal of material on said floor;
 f. two side gates, made of vertical bars a minimum of 2" apart, with each of said side gates pivotally connected to a first end of minimum of two angle brackets with a second end of each of said angle brackets mounted to a rafter of said roof in such a manner that when said two side gates are biased outward by a first force each of said two side gates will hang in a vertical position and allow a maximum width opening to contain hay between said side gates, further when said first force is removed a second force may bias each of said two side gates toward said hay contained between said two side gates and when said second force is removed said two side gates move outward.

* * * * *